United States Patent [19]
Ogawa et al.

[11] Patent Number: 5,774,996
[45] Date of Patent: Jul. 7, 1998

[54] BIAXIAL INCLINATION SENSOR

[75] Inventors: Hideo Ogawa; Norihisa Teraji, both of Hachioji; Isshu Terauchi, Nara-ken, all of Japan

[73] Assignee: Nissho Corporation, Osaka, Japan

[21] Appl. No.: 598,384

[22] Filed: Feb. 8, 1996

[30] Foreign Application Priority Data

Feb. 14, 1995 [JP] Japan ................................... 7-025614

[51] Int. Cl.$^6$ ................................ G01C 9/06; G01C 9/24
[52] U.S. Cl. ................................................ 33/366; 33/379
[58] Field of Search ........................... 33/366, 365, 379

[56] References Cited

U.S. PATENT DOCUMENTS

| | | | |
|---|---|---|---|
| 2,713,726 | 7/1955 | Dixson | 33/366 |
| 3,290,786 | 12/1966 | Parkin | 33/366 |
| 3,497,950 | 3/1970 | Squire et al. | 33/366 |
| 4,244,117 | 1/1981 | Cantarella et al. | 33/366 |
| 4,531,300 | 7/1985 | Heidel et al. | 33/366 |
| 4,536,967 | 8/1985 | Beitzer | 33/379 |
| 4,547,972 | 10/1985 | Heidel et al. | 33/366 |
| 4,567,666 | 2/1986 | Neis et al. | 33/645 |
| 4,583,296 | 4/1986 | Dell'Acqua | 33/366 |
| 5,428,902 | 7/1995 | Cheah | 33/366 |

FOREIGN PATENT DOCUMENTS

| | | | |
|---|---|---|---|
| 03142315 A | 6/1991 | Japan . | |
| 665628 | 1/1952 | United Kingdom | 33/366 |
| 2250600 | 6/1992 | United Kingdom | 33/366 |

Primary Examiner—William A. Cuchlinski, Jr.
Assistant Examiner—Andrew Hirshfeld
Attorney, Agent, or Firm—Armstrong, Westerman, Hattori, McLeland & Naughton

[57] ABSTRACT

A biaxial inclination sensor including, in the inner bottom of a circular liquid chamber 11 formed in a sensor holder 1 made of an insulating material and having a bottom surface 28 made horizontal, one common electrode 2 made of 18K gold having a low ionization tendency in a central position and vertical with respect to the bottom surface 28 and four outer electrodes 3 made of the same material as the common electrode 2 and passing vertically through the bottom surface 28 at points of intersection of two horizontal orthogonal lines passing through the center and a circle of a predetermined radius about the center and all having the same surface area. An opening in the liquid chamber 11 of the sensor holder 1 is closed off in a liquidproof manner by a glass window plate 4 having a spherical concave portion 9 of a surface roughness less than JIS Rmax 0.25 in its inner surface. A gas bubble 8 and an electrolyte 7 made by mixing pure water as a solvent, magnesium sulfate as a solute and anhydrous methanol as a solution in such ratios that the impedance between the electrodes is 10KΩ are sealed into the sealed liquid chamber 11 in amounts such that the common electrode 2 is always submerged in the electrolyte and does not make contact with the gas bubble 8. The biaxial inclination sensor has a high resolution and reproducibility and stability of detection with which it is possible to secure a high level indication of inclination angle zero by attitude control.

8 Claims, 4 Drawing Sheets

BIAXIAL INCLINATION SENSOR

BACKGROUND OF THE INVENTION

1. Field of the Invention

This invention relates to a biaxial inclination sensor comprising a liquid and a gas bubble sealed in a vessel for sensing levelness by detecting the position of the gas bubble by means of electronic signals, the sensor being used in automatic leveling devices of machines and instruments, angle gauges, surveying devices, measuring instruments, airplanes, ships, trains, cars and other things and places where high-precision level indication is required.

2. Prior Art

Conventional biaxial inclination sensors of this kind include (1) those having a sealed concave part serving as a circular liquid chamber which is formed by an electrode mounting plate and a warhead-shaped vessel having an upper inner surface formed into a spherical concave part. In the center of the electrode mounting plate, a common electrode is mounted and, in positions at a predetermined spacing on radial lines about the common electrode, outer electrodes the same height as the common electrode are mounted. These electrodes pass vertically through the electrode mounting plate in a liquidproof, sealed state. An electrolyte and a gas are sealed inside the sealed concave part serving as a circular liquid chamber. These sensors detect inclination in two directions by detecting differences in the submerged height of the electrodes resulting from inclination of the surface of the electrolyte by means of electrical signals. Conventional biaxial inclination sensors also include (2) those wherein the inside of a spherical vessel is filled with substances having different specific gravities and which do not mix with each other and, due to gravity the substance with the lower specific gravity collects vertically upward. A positional relationship of the substances corresponding to the bearing and angle of an inclination of the vessel is detected by a detecting device disposed outside the vessel. The sensor uses as the different substances a magnetic fluid or a permanent magnet and a non-magnetic substance, or a fluid having a high electrical conductivity and an electrically insulating substance. According to the case, the positional relationship is input into a computing circuit and converted to and outputted as a vessel inclination direction and angle. A detection signal is obtained either by a magnetic detecting device applying a magnetic bias in a fixed direction or by an output signal corresponding to the size of a static capacity (for example Japanese Laid-Open Patent Publication No. H.3-142315).

The biaxial inclination sensors (1) described above have the object of inclination angle zero horizontal attitude control, but there has been the problem that these sensors cannot be made highly accurate. The reasons for this inaccuracy includes changes in the vertical position of the liquid surface due to expansion and contraction of the electrolyte caused by changes in the surrounding temperature of the sensor, and changes in the characteristics of the electrolyte caused by temperature changes and instability of the contact surface due to surface tension of the liquid which result in accuracy errors and errors of reproducibility and the liquid surface differences only produce small changes in output.

The biaxial inclination sensors (2) described above have the object of measuring overall bearing angle, but with these sensors there have been the problems that, when a magnetic fluid is used, its surface tension is large and for reasons relating to the frictional coefficient between the magnetic fluid and the inner wall of the vessel, a high resolution cannot be obtained, and, with magnetic lines of force or static capacity methods, dependence on outside detecting devices is high and this becomes a cause of errors.

SUMMARY OF THE INVENTION

An object of this invention is to eliminate causes of errors and provide a biaxial inclination sensor having high resolution, reproducibility and stability of detection so it is possible to obtain a high level indication of inclination angle zero by attitude control.

In a biaxial inclination sensor according to the invention, a sensor holder made of an insulating material has a horizontal flat bottom surface and a concave portion serving as a liquid chamber formed in a central portion thereof and a common electrode mounted in a liquidproof manner passes vertically through the inner bottom center of the concave portion serving as a liquid chamber and outer electrodes projecting higher than the common electrode and all having the same surface area also mounted in a liquidproof manner pass vertically through the inner bottom of the concave portion serving as a liquid chamber at points of intersection of two horizontal orthogonal axes passing through said inner bottom center and a circle of a predetermined radius about said inner bottom center, an opening of the sensor holder is liquidproof closed in a liquidproof manner by a window plate made of an insulating material such as glass a central part of or all of a surface of which is formed into a spherical concave portion having high surface roughness with the spherical concave portion of the window plate facing inward and the center thereof aligned with the center axis of the common electrode, and a gas bubble and an electrolyte having a low surface tension and mixed in a ratio such that the impedance between the electrodes is a predetermined value in the horizontal state are sealed in the concave portion serving as a liquid chamber in an amount such that the common electrode is always submerged in the electrolyte.

With a biaxial inclination sensor according to the invention constructed as described above, because the common electrode is positioned vertically below the center of a spherical surface in an inclination angle zero state (the completely horizontal state) and the common electrode is always submerged in an electrolyte having a low surface tension and mixed in a ratio such that the impedance between the electrodes is a predetermined value. When the gas bubble is displaced along the spherical surface due to an inclination, the impedance between the electrodes changes as a result of this displacement. This change can be converted directly into an electrical signal and outputted as an analogue signal, and, by controlling the analogue signal to zero with a controlling means using the analogue signal, it is possible to obtain a level indication which is highly accurate at inclination angle zero.

3

Figure 6:
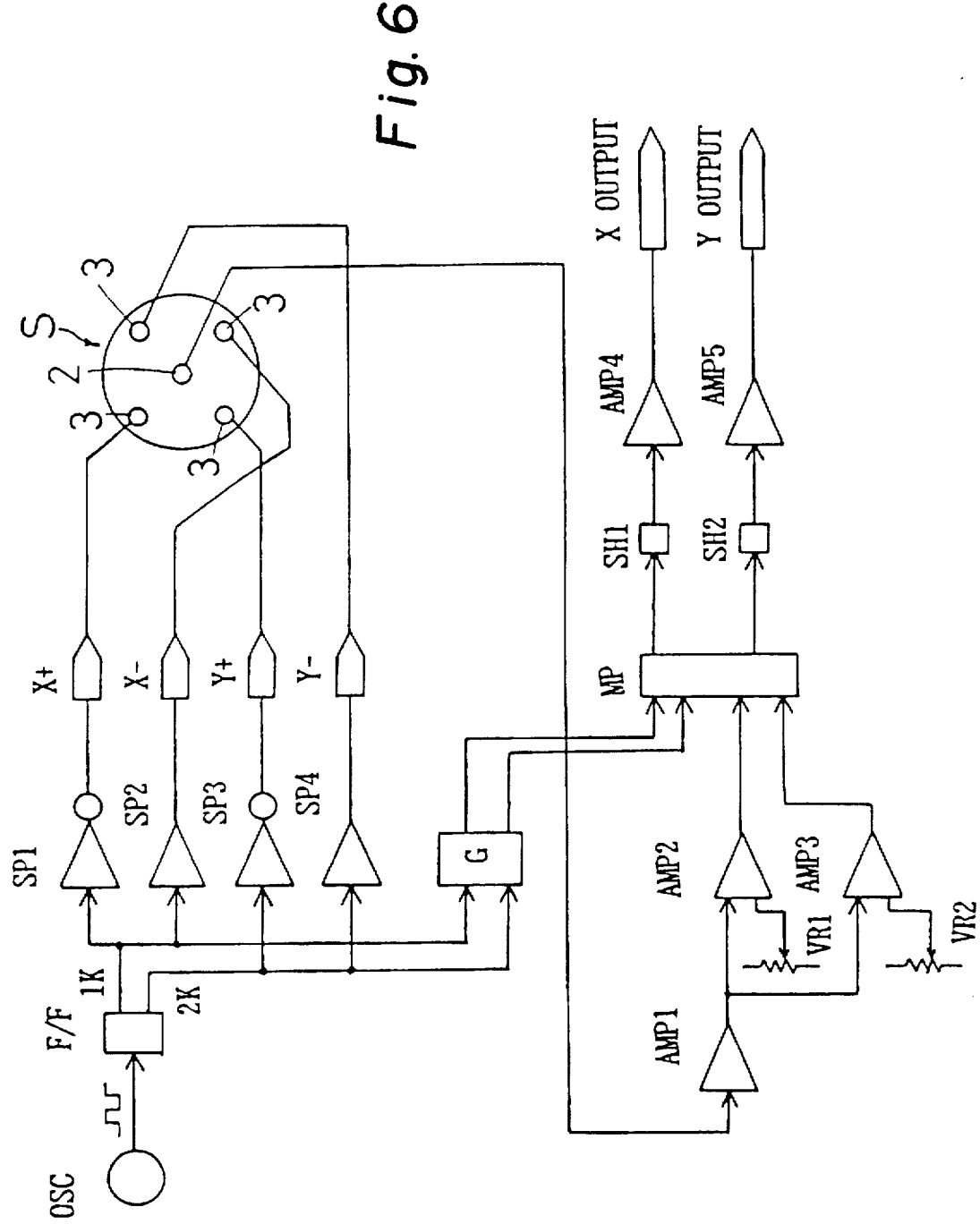

FIG. 6 is a view illustrating a sensor amplifier.

DETAILED DESCRIPTION OF THE PREFERRED EMBODIMENTS (First Preferred Embodiment)

Figure 1:
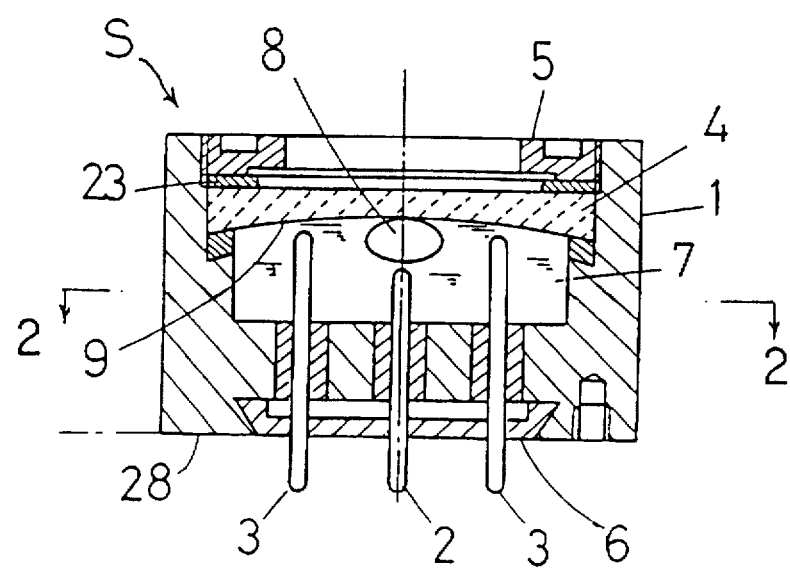
FIG. 1 is an enlarged sectional view of a biaxial inclination sensor according to a first preferred embodiment of the invention.
Figure 2:
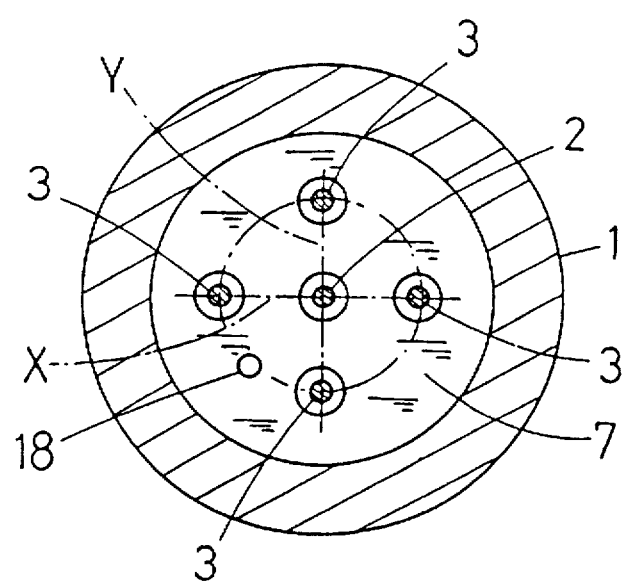
FIG. 2 is a sectional view on the line A—A in FIG. 1.
Figure 3:
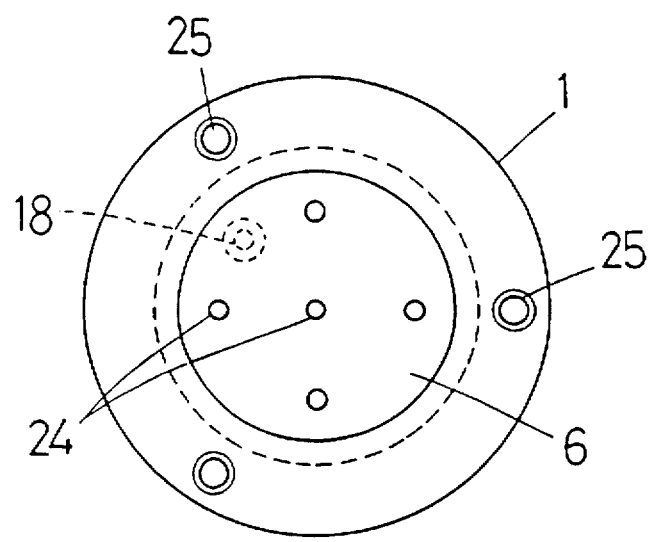
FIG. 3 is a bottom surface view of the same biaxial inclination sensor.
Figure 4:
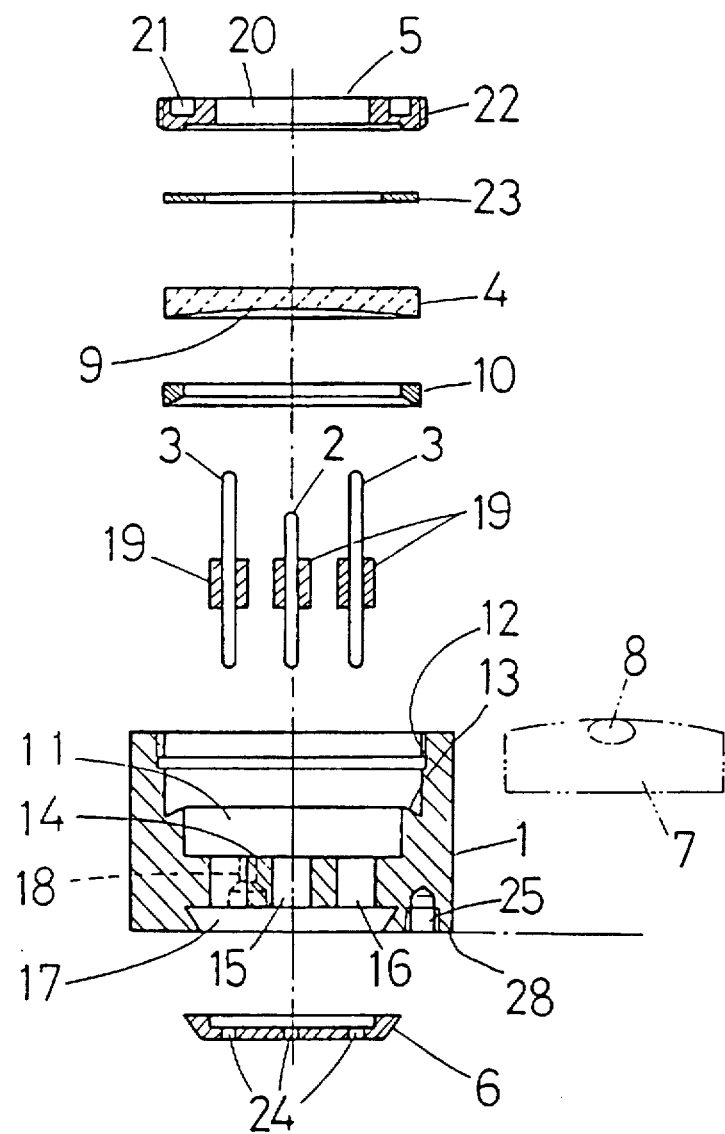
FIG. 4 is an exploded sectional view of the same biaxial inclination sensor.

FIG. 1 is an enlarged sectional view of a biaxial inclination sensor according to the invention. FIG. 2 is a sectional view on the line A—A in FIG. 1. FIG. 3 is a bottom surface view and FIG. 4 is an exploded sectional view.

A cylindrical sensor holder 1 is made of a polyamide synthetic resin and a bottom surface 28 thereof is finished to a highly accurate levelness. A concave portion serving as a liquid chamber 11 is formed in the middle of the sensor holder 1, and a female thread 12 and a supporting step 13 below that are formed around the opening of the liquid chamber 11.

A common electrode mounting hole 15 is provided in the center of the bottom 14 of the liquid chamber 11. Outer electrode mounting holes 16 are provided in the liquid chamber bottom 14 at the points of intersection of a 10 mm diameter circle having the common electrode mounting hole 15 at its center and biaxial lines X, Y intersecting horizontally at right angles. A board recess 17 provided with a charging hole 18 passing through to the liquid chamber bottom 14 and mounting screw holes 25 around the circuit board recess 17 are provided in the bottom surface 28.

A common electrode 2 and four outer electrodes 3 are made of 18K gold (Au), which is a metal material having a low ionization tendency, are 0.6 mm in diameter and have polished surfaces, and the surface areas of the outer electrodes 3 are all the same.

The common electrode 2 is of a length such that it is always submerged in an electrolyte 7 and does not make contact with a sealed-in gas bubble 8 which will be further discussed later. The outer electrodes 3 are of such a length that their tips are as close as possible to the surface of a spherical concave portion 9 in a window plate 4 which will be further discussed later. The common electrode 2 and the outer electrodes 3 are in a liquidproof manner and vertically mounted in polyoxymethylene (for example Dellulin—registered trademark of Du Pont Co.) embedding members 19 in the common electrode mounting hole 15 and outer electrode mounting holes 16 provided in the liquid chamber bottom 14 of the sensor holder 1. The front ends of electrodes 2 and 3 project into the liquid chamber 11 and their rear ends project from the circuit board recess 17 to the bottom surface side.

The window plate 4 is made of glass and mounted on a polytetrafluoroethylene (for example Teflon—registered trademark of Du Pont Co.) packing 10 on the supporting step 13 of the liquid chamber 11. A spherical concave portion 9 of a suitable radius of curvature and a surface roughness made less than Japanese Industrial Standard JIS Rmax 0.2S is formed over the entire inner-side surface of the window plate 4.

A brass holding ring 5 has a window hole 20 provided in its center, a pair of blind holes 21 for fastening formed in its upper surface and a male thread 22 for screwing into the female thread 12 formed on its outer surface. Rings fix the window plate 4 to the sensor holder 1 by way of an annular cushion sheet 23 made of vinyl chloride.

An electrode support board 6 is dinner plate shaped in cross-section and has electrode holes 24 formed therein in positions corresponding to the centers of the common electrode mounting hole 15 and the outer electrode mounting holes 16. Board 6 is fitted or fixed with adhesive in the board recess 17 formed in the bottom of the sensor holder 1 with the rear ends of the electrodes projecting through the electrode holes 24.

4

Reference numeral 7 denotes an electrolyte and 8 a gas bubble. In order to have a low surface tension, a high boiling point and a low freezing point, the electrolyte 7 consists of water (pure) as a solvent, magnesium sulfate as a solute and either anhydrous methanol or anhydrous ethanol as a solution mixed in such ratios that the impedance between the electrodes is 10KΩ. The amount of the electrolyte 7 used is such that the common electrode 2 is always submerged. The gas bubble 8 is an amount of air such that the common electrode 2 does not make contact therewith. The electrolyte 7 and the gas bubble 8 are charged into the sensor holder 1 through the charging hole 18 provided in the bottom surface of the sensor holder 1.

(Second Preferred Embodiment)

Figure 5:
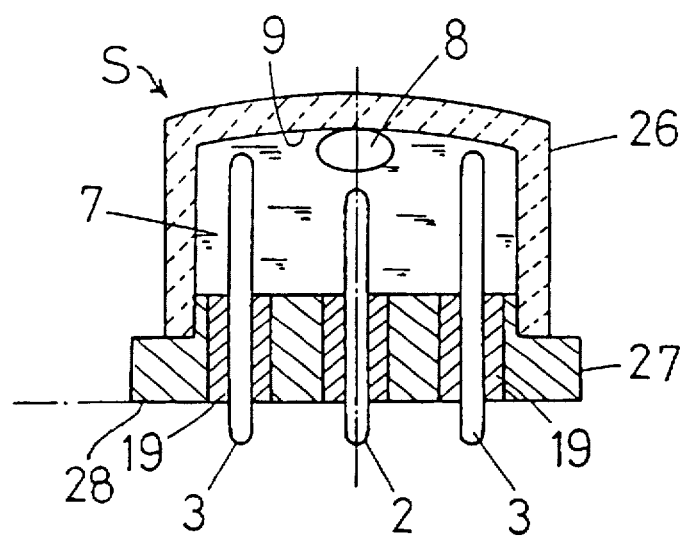
FIG. 5 is an enlarged sectional view of a biaxial inclination sensor according to a second preferred embodiment of the invention.

A biaxial inclination sensor according to a second preferred embodiment of the invention will now be described with reference to FIG. 5. This biaxial inclination sensor comprises a glass hollow warhead-shaped member 26 having one end open and its upper inner surface formed into a spherical concave portion 9. The sensor further includes a common electrode 2 and outer electrodes 3 mounted vertically with respect to a horizontal bottom surface 28 in the same way as in the first preferred embodiment and an electrode mounting plate 27 provided with a charging hole (not shown in the drawing; see FIG. 3). The open end of the hollow warhead-shaped member 26 is closed off in a liquidproof manner by the electrode mounting plate 27 and the bottom surface 28 is horizontal. The common electrode 2 and the four outer electrodes 3, the surface roughness of the surface of the spherical concave portion 9, the electrolyte 7 and the gas bubble 8 are the same as in the first preferred embodiment and therefore have been given the same reference numbers and descriptions thereof will be omitted.

In this embodiment, unlike the first preferred embodiment, because the holding ring 5, the packing 10 and the cushion sheet 23 are unnecessary, the number of parts for the sensor is reduced and the manufacture and assembly of the biaxial inclination sensor can be made simple and cheap.

As the common electrode 2 and the outer electrodes 3, a material having a low ionization tendency is preferable. When the impedance between the electrodes is too high, they pick up various kinds of noise and this produces errors and when it is too low this results in lack of economy and functional loss due to plating of the electrodes. Therefore, the material of the electrodes should be selected with this taken into consideration.

The electrolyte 7 is not limited to the above-mentioned preferred embodiment, but it is necessary to use an electrolyte having a low surface tension, a high boiling point and a low freezing point.

As means for converting the position of a gas bubble directly into an electrical signal according to a biaxial inclination sensor S of either of the first and second preferred embodiments described above, for example, means can be employed such as shown in FIG. 6. In this means an alternating current of a basic pulse of 4 KHz is produced by an oscillator OSC. This basic pulse is divided into different pulses of 1 KHz and 2 KHz of duty 50% by a frequency divider F/F, these pulses are made into negative phase alternating current pulses (X+, X−, Y+, Y−) by buffer amplifiers SP1 to SP4 and impressed on the outer electrodes 3 of the biaxial inclination sensor S. To extract information from this, a signal from the common electrode 2 of the biaxial inclination sensor S is fed into a signal amplifying circuit AMP1, the output thereof is fed into an analogue switch MP through two amplifying circuits AMP2, AMP3 having a zero drift correcting function using variable resistors VR1, VR2, the above-mentioned two different pulses from the frequency divider F/F are synchronized into two axis directions in a logic circuit G and fed into the analogue switch MP, analogue signals of the two axis directions split in the analogue switch MP are respectively sent to amplifiers AMP4, AMP5 through sample and hold circuits SH1, SH2 and from these amplifiers AMP4, AMP5 are outputted individually as analogue signals corresponding to the axis directions. However, the means is not limited to this and changing to a conventional converting means would be a simple substitution and therefore is included in the invention without influencing the scope of the claims thereof.

A biaxial inclination sensor according to the invention is used by being fixed to a level surface of an apparatus or device required to be disposed horizontally. The apparatus or device is kept level by conventional mechanical controlling means, for example, by rotating motors for changing the inclination of the X and Y axes according to digital signals converted by a signal convertor, converting this to linear motion and changing the inclination of the surface on which the sensor is mounted so that the analogue output thereof is controlled to zero.

With a biaxial inclination sensor according to the invention which is constructed as described above, because the common electrode is positioned vertically below the center of a spherical surface in an inclination angle zero state and the common electrode is always submerged in an electrolyte having a low surface tension and mixed in a ratio such that the impedance between the electrodes is a predetermined value, when the gas bubble is displaced along the spherical surface due to an inclination, the impedance between the electrodes changes as a result of this displacement. This change can be converted directly into an electrical signal and outputted as an analogue signal, and, by controlling the analogue signal to zero with a controlling means using the analogue signal, it is possible to obtain a highly accurate level at inclination angle zero.

Particularly, by sealing into the sensor a gas bubble and an electrolyte having a low surface tension and mixed in a ratio such that the impedance between the electrodes is a predetermined value and so that the common electrode is always submerged in the electrolyte, conventional causes of errors are eliminated and it is possible to solidly detect changes in the impedance between the electrodes produced by displacement of the gas bubble. Consequently, the angle information output is high and output fluctuation errors caused by physical changes such as expansion and contraction and changes in the surface tension of the electrolyte due to changes in the surrounding temperature become very small. In addition, a high resolution and reproducibility are ensured and attitude control of a highly accurate zero inclination angle state of an apparatus in which the sensor is used can be achieved. Furthermore, it is possible to cheaply provide a biaxial inclination sensor most suitable for automatic leveling devices of machines and instruments, angle gauges, surveying devices, measuring instruments, airplanes, ships, trains, cars and other fields in which a high-precision level is required.

What is claimed is:

1. A biaxial inclination sensor comprising:
    a sensor holder made of an insulating material and having a horizontal flat bottom surface and a concave portion serving as a liquid chamber formed in a central portion thereof,
    a common electrode passing vertically and in a liquidproof manner through the center of an inner bottom of the concave portion serving as a liquid chamber,
    outer electrodes projecting higher than the common electrode and all having the same surface area passing vertically and in a liquidproof manner through the inner bottom of the concave portion serving as a liquid chamber and at points of intersection of two horizontal orthogonal axes passing through said inner bottom center and a circle of a predetermined radius about said inner bottom center,
    a window plate of an insulating material closing an opening of the sensor holder in a liquidproof manner, at least a central part of a surface of which is formed into a spherical concave portion having high surface roughness with the spherical concave portion of the window plate facing inward and the center thereof aligned with the center axis of the common electrode, and
    a gas bubble and an electrolyte, the electrolyte having a low surface tension and mixed in a ratio such that the impedance between the electrodes is a predetermined value in the horizontal state, sealed in the concave portion serving as a liquid chamber in an amount such that the common electrode is always submerged in the electrolyte.

2. A biaxial inclination sensor according to claim 1 wherein the common electrode and the outer electrodes are made of a metal material having a low ionization tendency and have polished surfaces and the surface areas of the outer electrodes are the same.

3. A biaxial inclination sensor according to claim 1 or 2 wherein the surface roughness of the window plate is less than Japanese Industrial Standard Rmax 0.2S.

4. A biaxial inclination sensor according to claim 1 or 2 wherein the electrolyte is a solution of pure water as a solvent, magnesium sulfate as a solute and one alcohol selected from the group consisting of anhydrous methanol and anhydrous ethanol in ratios such that impedance between the electrodes is 10KΩ.

5. A biaxial inclination sensor according to claim 1 or 2 comprising means for constituting an alternating current into a predetermined basic pulse with an oscillator, dividing this basic pulse into two different pulses of duty 50% with a frequency divider, impressing the pulses on the outer electrodes as negative phase alternating current pulses with buffer amplifiers, to extract information from this impressing a signal from the common electrode into an amplifier circuit, feeding the output thereof through two amplifier circuits having a zero drift correction function into an analogue switch, respectively synchronizing the two different pulses from the frequency divider with two axis directions and feeding them into the analogue switch, sending analogue signals of two axis directions split in the analogue switch respectively through sample and hold circuits to amplifiers and outputting from the amplifiers predetermined analogue signals corresponding to an inclination.

6. A biaxial inclination sensor according to claim 1 wherein the window plate is made of glass.

7. A biaxial inclination sensor according to claim 2 wherein the common electrode and the outer electrodes are made of 18K Au.

8. A biaxial inclination sensor according to claim 3 wherein the electrolyte is a solution of pure water as a solvent, magnesium sulfate as a solute and one alcohol selected from the group consisting of anhydrous methanol and anhydrous ethanol in ratios such that impedance between the electrodes is 10KΩ.

* * * * *